United States Patent [19]

Gonzalez

[11] Patent Number: 5,121,710
[45] Date of Patent: Jun. 16, 1992

[54] COLLAPSIBLE DOGHOUSE

[76] Inventor: Marta Gonzalez, 4430 NW. 207th Dr., Miami, Fla. 33055

[21] Appl. No.: 797,174

[22] Filed: Nov. 25, 1991

[51] Int. Cl.$^5$ .............................................. A01K 1/02
[52] U.S. Cl. ...................................... 119/19; 446/476
[58] Field of Search ...................... 119/16, 17, 19, 23; 220/4.28, 4.31; 446/476, 478, 105; D30/108, 109, 110; 217/43 R, 12 R, 13, 45

[56] References Cited

U.S. PATENT DOCUMENTS

| | | | |
|---|---|---|---|
| 2,793,401 | 5/1957 | Paschke | 52/264 |
| 3,132,443 | 5/1964 | Kuhn | 446/105 X |
| 3,234,907 | 2/1966 | Plancia | 119/17 |
| 3,478,722 | 11/1969 | Fallone et al. | 119/23 |
| 4,256,056 | 3/1981 | Sou | 119/19 |
| 4,869,206 | 9/1989 | Spina | 119/17 |

*Primary Examiner*—Gene Mancene
*Assistant Examiner*—Thomas Price
*Attorney, Agent, or Firm*—Malloy, Downey & Malloy

[57] ABSTRACT

A collapsible doghouse, to be used indoors or outdoors, to provide a comfortable and easy to clean place for a dog to rest or seek shade. The doghouse includes elongate side walls, a pair of distal walls, one of which includes an arched entranceway and another of which includes a cutout drainage slot, a roof portion, and a weightable base portion, all of which are securely, yet easily removably connected, and are formed of a substantially solid, yet flexible, water repellant plastic which will facilitate easy cleaning and drainage, and lightweight transportation.

8 Claims, 4 Drawing Sheets

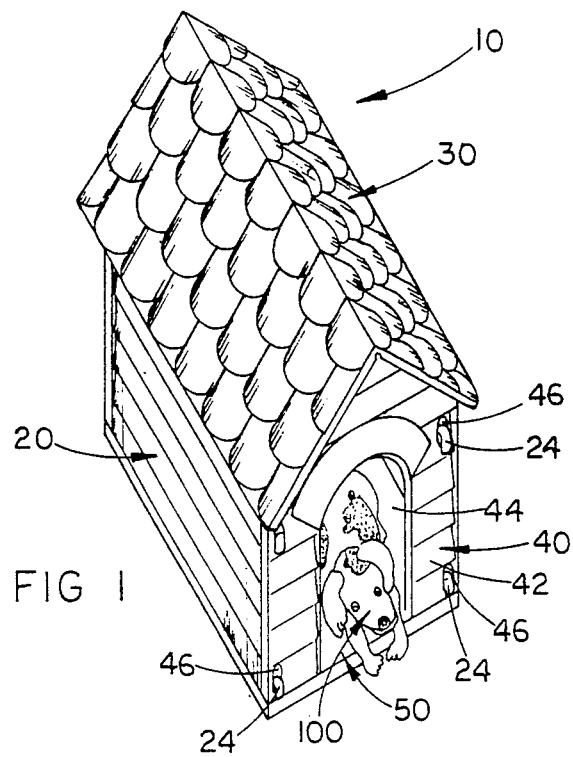
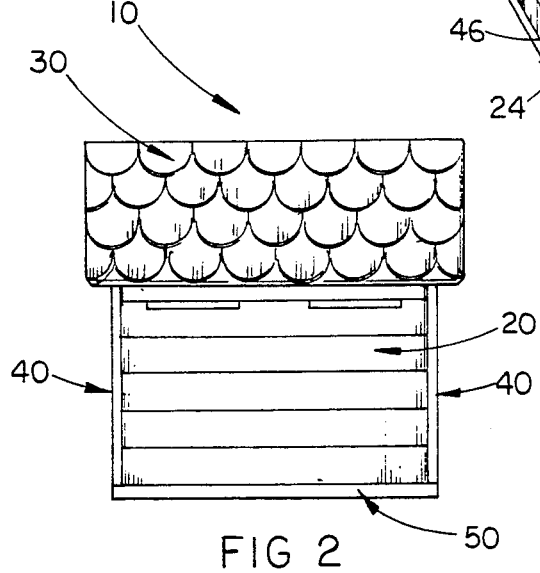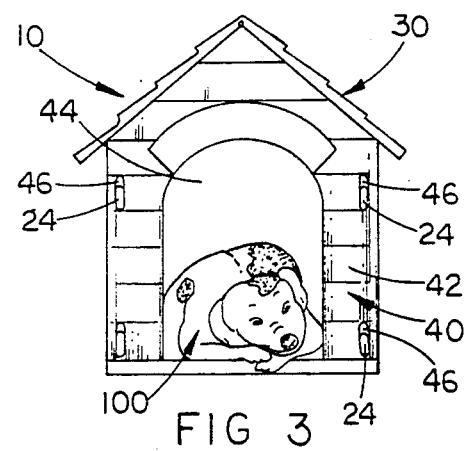
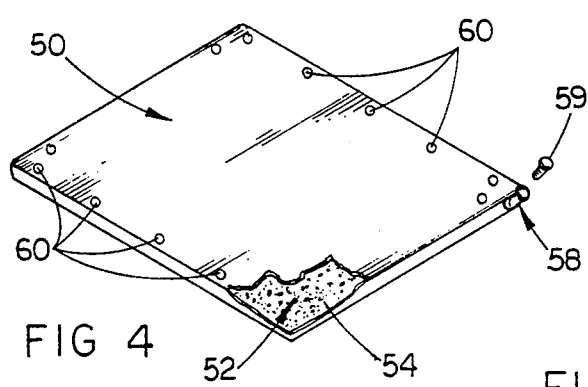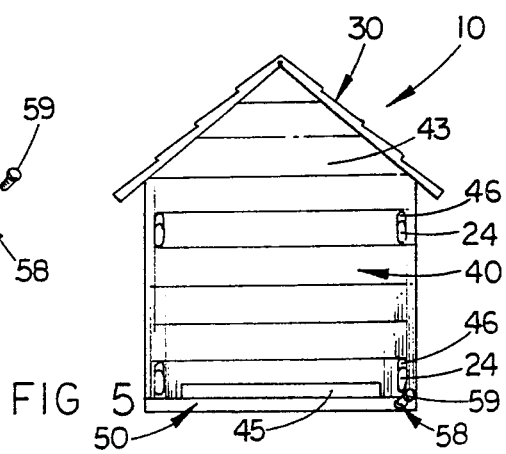

1

COLLAPSIBLE DOGHOUSE

BACKGROUND OF THE INVENTION

1. Field of the Invention

This invention relates to a collapsible doghouse adapted to provide a comfortable place for a dog, while providing an easily cleanable and drainable structure which is substantially rigid when erect, yet is quickly and easily collapsible as a result of its lightweight and water repellant material composition.

2. Description of the Prior Art

Many dog owners who desire to keep their dogs outside, or desire that their dog have a place of its own indoors, provide doghouses for their pet. These doghouses, are usually particularly heavy and sturdy to prevent a dog from disassembling it, and are generally formed of wood panels which are permanently attached. While these types of doghouses do provide an attractive appearance, as a result of their composition, they are often difficult to clean and therefore often become malodorous or begin to rot from water damage. Further, they are not easily moved, which necessitates that they be placed and remain in a single location. Accordingly, it is necessary to provide a doghouse which is sufficiently sturdy, may be easily collapsed and removed or transported, is easy to clean, and will not be susceptible to water damage or rot.

In the past, attempts have been made to provide a collapsible or transportable doghouse. Examples of such assemblies may be found in United States patents to Hawley, III, U.S. Pat. No. 4,006,713, wherein the doghouse had a collapsible plywood frame, and the design patents to Kelley, U.S. Pat. No. 218,902, and Parrett, U.S. Pat. No. 276,943, both of which include distinctive structures. Unfortunately, none of these designs are adapted to be collapsed entirely as well as partially by quick and easy detachment of selected portions, or to be easily cleaned by simply being hosed down and allowing the water to drain through a drainage slot cut into the water repellant material.

Applicant's invention is precisely structured to provide a lightweight frame, which nonetheless becomes a secure and stable structure when attached. Further, the applicant's invention may be easily transported, is not susceptible to water damage or rot, and includes features adapted to enable quick and easy cleaning of the interior. No other assembly provides such a combination of essential functions, with an aesthetically appealing exterior. Further, applicant's invention may be structured in a variety of configurations which may be reconfigured or enlarged when desired.

SUMMARY OF THE INVENTION

The present invention is directed towards a collapsible doghouse, which may be used either indoors or outdoors and may be easily transported or moved. The doghouse, which may be sized to be suitable for any size dog, includes at least two side walls, at least two distal walls, a base, and a roof portion, all of which may be securely, yet removably interconnected by means of a plurality of slots and hooked extensions or pegs and apertures. The doghouse, which includes at least one arched opening in a distal wall, further includes a drainage slot cut into a lower portion of at least one distal wall, thereby providing facilitated drainage means when cleaning. The base portion includes weight means therein to enable the base to maintain the entire doghouse in a fixed and stable position. The weight means may be easily removed from the base through a sealable drainage opening. The entire doghouse is composed of a substantially solid, yet flexible, water repellant plastic material, which makes the doghouse water repellant and lightweight when transporting.

BRIEF DESCRIPTION OF THE DRAWINGS

For a fuller understanding of the nature of the present invention, reference should be had to the following detailed description taken in connection with the accompanying drawings, in which:

FIG. 1 is an elevated perspective view of the first embodiment of the collapsible doghouse.

FIG. 2 is a side view of the first embodiment of the collapsible doghouse.

FIG. 3 is a front view of the first embodiment of the collapsible doghouse.

FIG. 4 is a detailed, partial cutaway view of the base of the collapsible doghouse.

FIG. 5 is a rear view of the first embodiment of the collapsible doghouse.

Like reference numerals refer to like parts throughout the several views of the drawings.

DETAILED DESCRIPTION OF THE PREFERRED EMBODIMENT

Figure 6:
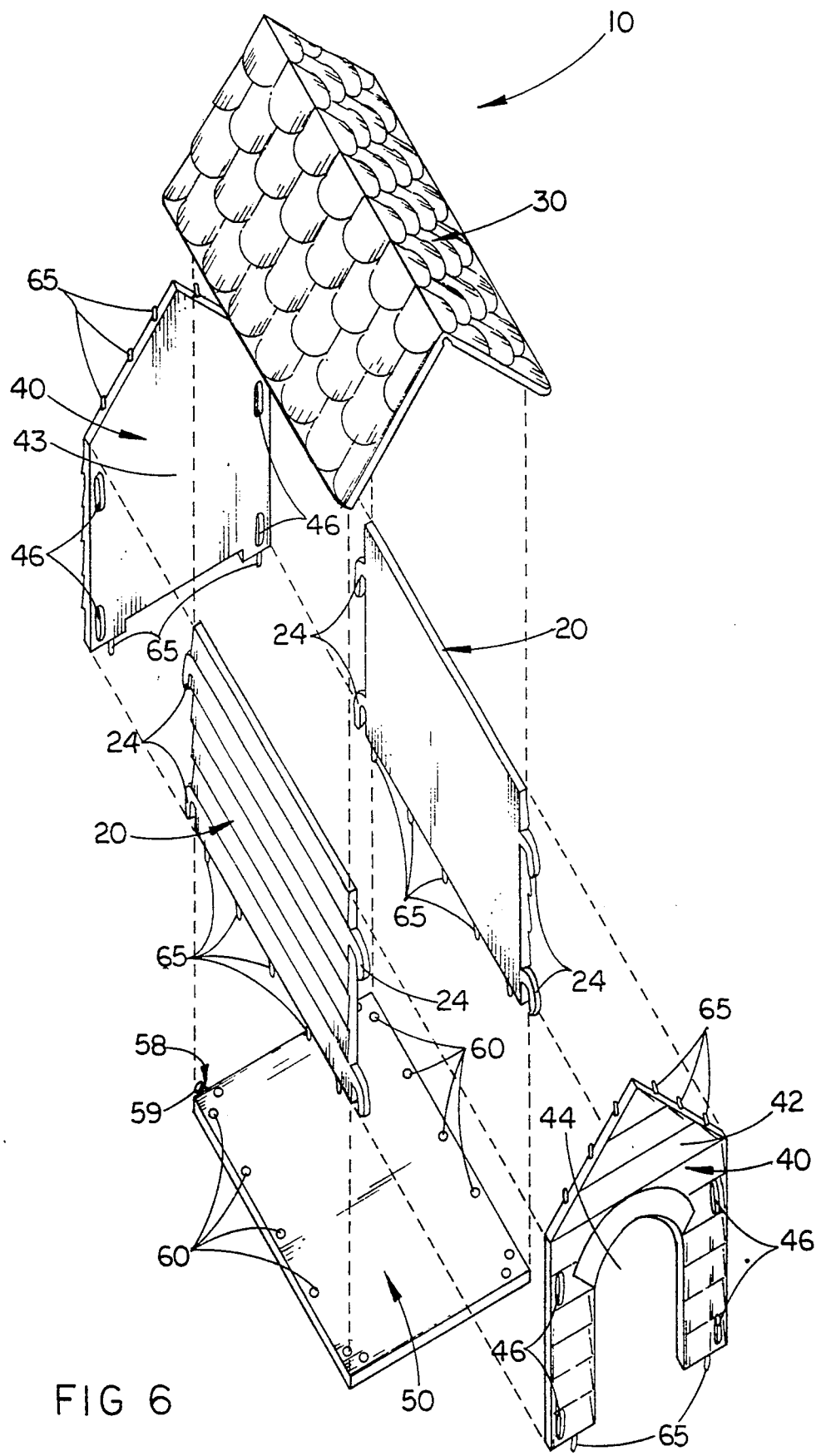
FIG. 6 is an exploded view of the first embodiment of the collapsible doghouse.

Detailed throughout FIGS. 1-11 are the two embodiments 10 and 10' of the collapsible doghouse. As shown in FIG. 1, the first embodiment of the doghouse 10 includes two elongate side walls 20, two distal walls 40, a base 50, and a roof portion 30. As detailed in FIG. 2, the side wall 20 is elongate and is designed to resemble a real wooden doghouse. Turning to FIGS. 3 and 5, the distal walls 40, may either be an entrance distal wall 42, shown in FIG. 3, or a solid distal wall 43, shown in FIG. 5. The entrance distal wall 43 includes an arched opening 44 to allow access to a dog 100, and is structured to resemble a real doghouse. The solid distal wall 43, shown in FIG. 5, includes only a drain slot 45 cut into a lower portion of the solid distal wall 43, which is structured and disposed to allow facilitated drainage of the doghouse 10 when cleaning.

Shown in FIG. 4 is the base portion 50. The base portion 50 contains a hollow interior wherein weight means 52 may be inserted so as to provide substantial weight, thereby maintaining the doghouse 10 in a secure, limited mobility position. Further included in the base 50 is drainage means 58, through which the weight means 52 may be inserted and removed. The drainage means 58 also include a plug 59 to contain the weight means 52 within the base 50. The weight means 52 may either be a liquid such as water, or a granular material such as sand 54.

Turning to FIG. 6, the distal walls 40 include a plurality of slots 46 cut therein. The slots 46 are structured and disposed to receive therethrough correspondingly positioned hooked extensions 24 on the side walls 20, in a securing, interlocking fashion. Protruding from the lower edge of the side portions 20, and an upper edge of the distal walls 40, are a plurality of elongate pegs 65. The elongate pegs 65 are structured and disposed to be fitted into correspondingly positioned apertures 60 in the base 50 and the roof portion 30. A detailed view of the positioning of the pegs 65 into the apertures 60 in the under side of the roof portion 30 may be more clearly seen in FIG. 10.

Figure 7:
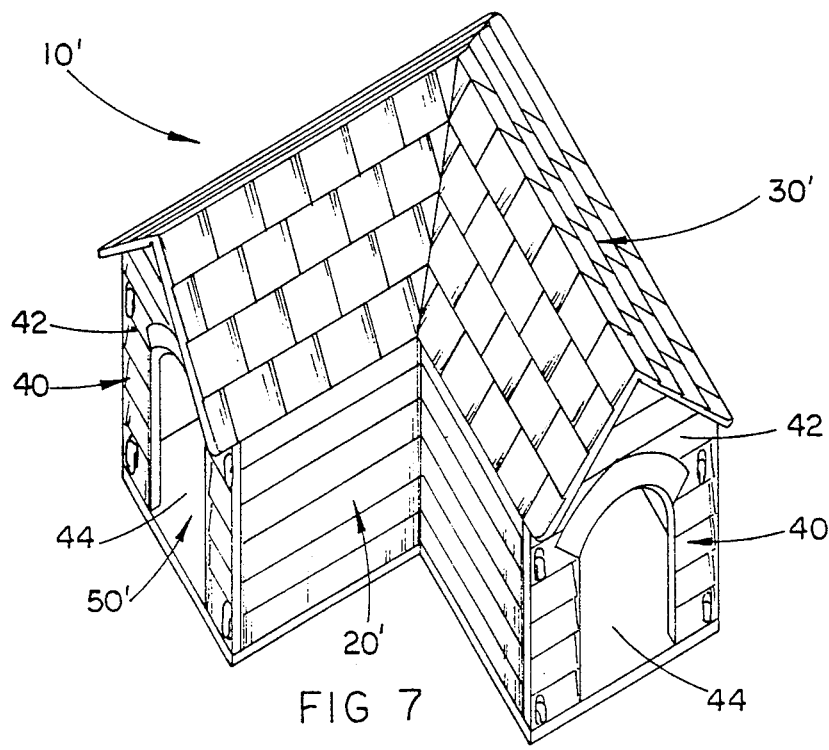
FIG. 7 is an elevated perspective view of the second embodiment of the collapsible doghouse.
Figure 8:
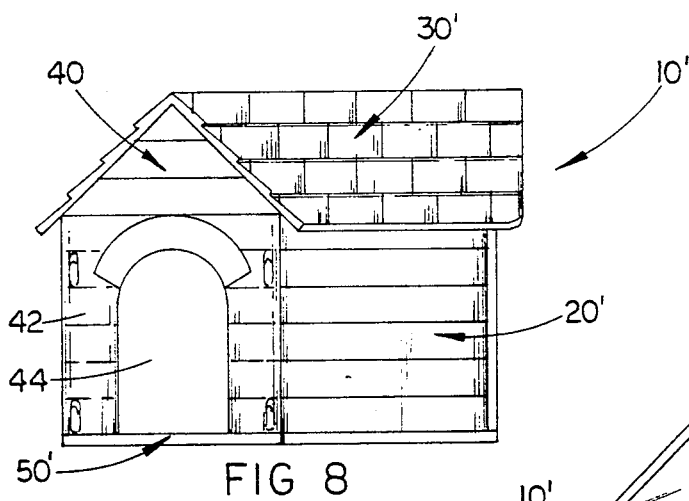
FIG. 8 is a front view of the second embodiment of the collapsible doghouse.
Figure 9:
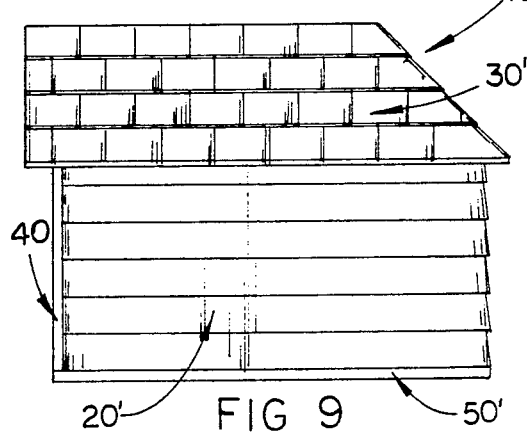
FIG. 9 is a rear view of the second embodiment of the collapsible doghouse.
Figure 10:
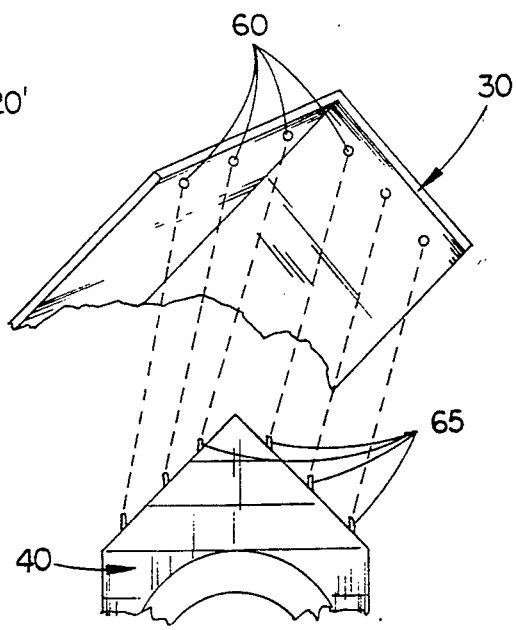
FIG. 10 is an under side view of an exploded roof portion, distal panel connection.
Figure 11:
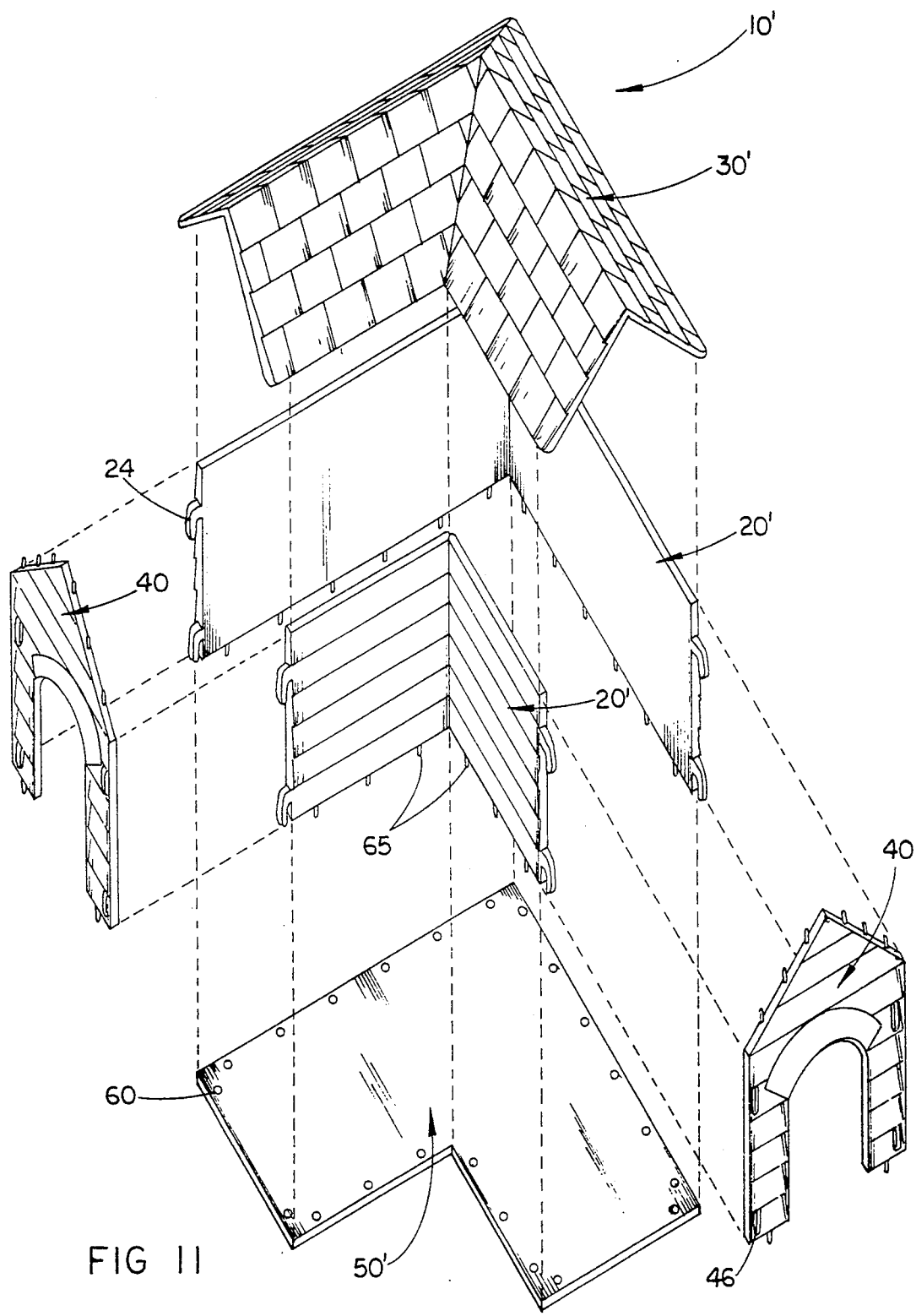
FIG. 11 is an exploded view of the second embodiment of the collapsible doghouse.

Turning to FIGS. 7-9, the second embodiment of the collapsible doghouse 10' is shown. The second embodiment of the collapsible doghouse 10' differs from the first embodiment of the collapsible doghouse 10, only in that the base 50', side walls 20', and the roof portion 30', are generally L-shaped, in order to provide a larger structure. Further, both of said distal walls 40 are entrance distal walls 42 where through a dog 100 may enter the collapsible doghouse 10'. As detailed in FIG. 11, the second embodiment of the collapsible doghouse 10' is also secured using the interconnecting slots 46 and hooked extensions 24, as well as the elongate pegs 65 and corresponding apertures 60 located in the base 50' and roof portion 30'.

It should be noted that applicant's invention is not limited to the particular designs detailed in the application, but may be extended and reconfigured into a collapsible doghouse of any shape, layout or size, and for any sized dog.

Now that the invention has been described,
What is claimed is:
1. A collapsible doghouse comprising:
a base,
at least two side walls,
at least two distal walls,
a roof portion,
said side walls including at least two hooked extensions on opposite distal ends of each side edge,
said distal walls including at least four cutout slots,
said slots being structured and disposed to receive therein said hooked extensions on said side walls in an interlocking fashion, thereby forming a secure frame,
a lower edge of said side walls and said distal walls including a plurality of elongate, protruding pegs,
said base including a plurality of apertures structured and disposed to receive said pegs securely therein,
said base including weight means to maintain said base in a substantially fixed location,
said base including a drainage opening for removing said weight means from said base, thereby facilitating mobility of said base,
said distal walls including an upper angled roof edge,
said roof edge including a second plurality of pegs,
said second plurality of pegs being structured and disposed to be fitted in interlocking relation into a second plurality of apertures in said roof portion,
at least one of said distal walls including an arched opening through which a dog may pass,
at least one of said distal walls including a cutout slot at a lower edge thereof, which is structured and disposed to allow drainage of fluids therethrough, and
said base, said side walls, said distal walls, and said roof portion made of a substantially solid, yet flexible, water repellant plastic, or a like material.

2. A collapsible doghouse as recited in claim 1 wherein said roof portion is easily removable such that cleaning of an interior area defined by said side walls, said distal walls, and said base may be facilitated.

3. A collapsible doghouse as recited in claim 2 wherein said walls, said base, and said roof portion, may be sized to accommodate any sized dog.

4. A collapsible doghouse as recited in claim 3 wherein an exterior of said distal walls, said side walls, and said roof portion resembles a wooden doghouse having a shingled roof.

5. A collapsible doghouse as recited in claim 4 wherein said weight means includes sand or a like granular substance.

6. A collapsible doghouse as recited in claim 4 wherein said weight means includes water or a like fluid substance.

7. A collapsible doghouse as recited in claim 4 wherein said side walls, said base, and said roof portion, have a generally L-shaped configuration, thereby providing more space in said interior area.

8. A collapsible doghouse as recited in claim 7 wherein there are two of said distal walls, each having one of said arched openings.

* * * * *